(12) United States Patent
Keuffer et al.

(10) Patent No.: US 11,032,079 B2
(45) Date of Patent: *Jun. 8, 2021

(54) VERIFICATION METHOD OF BIOMETRIC AUTHENTICATION

(71) Applicant: IDEMIA IDENTITY & SECURITY FRANCE, Issy-les-Moulineaux (FR)

(72) Inventors: Julien Paul Keuffer, Issy les Moulineaux (FR); Herve Chabanne, Issy les Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 245 days.

This patent is subject to a terminal disclaimer.

(21) Appl. No.: 16/151,230

(22) Filed: Oct. 3, 2018

(65) Prior Publication Data

US 2019/0103971 A1 Apr. 4, 2019

(30) Foreign Application Priority Data

Oct. 4, 2017 (FR) ..................... 1759292

(51) Int. Cl.
*H04L 29/00* (2006.01)
*H04L 9/32* (2006.01)

(52) U.S. Cl.
CPC .......... *H04L 9/3231* (2013.01); *H04L 9/3218* (2013.01); *H04L 9/3221* (2013.01); *H04L 9/3236* (2013.01); *H04L 9/3247* (2013.01); *H04L 9/3239* (2013.01); *H04L 2209/42* (2013.01)

(58) Field of Classification Search
CPC ............... H04L 9/3231; H04L 63/0861; H04L 63/0428; H04L 9/3239; H04L 9/3247; H04L 9/3218; H04L 9/3221; H04L 9/3236; H04L 2209/42
See application file for complete search history.

(56) References Cited

FOREIGN PATENT DOCUMENTS

FR 3050853 B1 4/2018

OTHER PUBLICATIONS

Preliminary Research Report received for French Application No. 1759292, dated Jun. 27, 2018, 2 pages (1 page of French Translation Cover Sheet and 1 pages of original document).
(Continued)

*Primary Examiner* — Ghazal B Shehni
(74) *Attorney, Agent, or Firm* — Womble Bond Dickinson (US) LLP (57) ABSTRACT

A method for processing biometric data performed by a proof entity and a verification entity; the proof entity having a biometric candidate datum, a biometric reference datum, a hash value of the biometric reference datum, a hash value of the biometric candidate datum; the verification entity having only the hash value of the biometric candidate datum; the method including steps of: generation by a data-processing unit of the proof entity of a zero-knowledge proof of the assumption that the biometric candidate datum and the biometric reference datum coincide; transmission to the verification entity of said zero-knowledge proof, the hash value of the biometric candidate datum, and the hash value of the biometric reference datum; verification by a data-processing unit of the verification entity that the zero-knowledge proof is valid, and that the hash value received from the biometric candidate datum corresponds to the one the verification entity has.

15 Claims, 2 Drawing Sheets

(56) References Cited

OTHER PUBLICATIONS

Parno et al., "Pinocchio: Nearly Practical Verifiable Computation", In Proceeding of the IEEE Symposium on Security and Privacy, May 2013, pp. 11-16.

Giacomelli et al., "ZKBoo: Faster Zero-Knowledge for Boolean Circuits", Proceedings of the 25th USENIX Security Symposium, Aug. 10-12, 2016, pp. 1069-1083.

Costello et al., "Gepetto: Versatile Verifiable Computation", in Proceedings of the IEEE Symposium on Security and Privacy, 2015, pp. 253-270.

Chabanne et al., "Delegating Biometric Authentication with the Sumcheck Protocol", IFIP International Conference on Information Security Theory and Practice, WISTP 2016: Information Security Theory and Practice, Part of the Lecture Notes in Computer Science book series (LNCS, vol. 9895), 2016, pp. 236-244.

Chabanne et al., "A Verifiable System for Automated Face Identification", 2016 International Conference of the Biometrics Special Interest Group (BIOSIG), Gesellschaft Fuer Informatik, 2016, 5 pages.

Ben-Sasson et al., "Zerocash: Decentralized Anonymous Payments from Bitcoin", 2014 IEEE Symposium on Security and Privacy, pp. 459-474.

Ben-Sasson et al., "SNARKs for C: Verifying Program Executions Succinctly and in Zero Knowledge", Annual Cryptology Conference, Advances in Cryptology—CRYPTO 2013, 2013, pp. 1-18.

Belguechi et al., "An Overview on Privacy Preserving Biometrics", in: Recent Application In Biometrics, IntechOpen, 2011, pp. 65-84.

VERIFICATION METHOD OF BIOMETRIC AUTHENTICATION

FIELD OF THE INVENTION

The invention relates to a method for processing biometric data, comprising the comparison between one biometric candidate datum and at least one biometric reference datum.

The invention applies especially to verification of biometric authentication performed by a personal device of an individual and not by an entity considered trustworthy as a governmental entity.

PRIOR ART

Identification or authentication systems are already known in which a user presents a trustworthy processing entity, a device belonging to customs for example, with a biometric datum which the entity compares to one or more biometric reference data recorded either in an identity document of the user, or in a database to which it has access.

The advantage of this scenario is that the result of the comparison between the biometric data is considered reliable as the comparison is performed by a trustworthy entity. But the identification or authentication step, comprising acquisition of a fresh biometric datum about the user, can take a long time and cause wait queues to form. This is the case for example when passing through customs, where authentication against a biometric datum contained in a passport of an individual is performed.

To avoid this type of inconvenience an alternative scenario is possible where the user would be authenticated or identified by means of an electronic device which is personal to him, such as a mobile telephone, and would provide the result of this authentication or identification only to the entity in charge of the control.

In this case, however there is the problem of the reliability of the result of the authentication or identification, and especially of the result of comparison between the biometric data which has enabled the user to be authenticated or identified. It is in fact necessary to propose means for the entity in charge of the control to be able to verify that the result is correct and that the user has not committed fraud or error in performing comparison of biometric data.

Application FR1653890 has proposed letting a user perform biometric authentication or identification with an electronic personal device and allowing a verification entity to verify the precision of the calculation of distance between the biometric data having permitted this authentication or identification by way of a proof method of SumCheck type.

Such a solution brings satisfaction, but it could still be improved since the proof method is interactive and needs multiple exchanges of data between the personal electronic device and the verification entity, and therefore takes more time.

One solution would be to provide all or some of the biometric data to the verification entity, but this is not acceptable for questions of respect of private life. FR1653890 proposes settling this problem by carrying out "masking" of biometric data, but such processing again takes up time and computer resources.

It would consequently be preferable to have a novel method for processing biometric data for authentication delegating calculation to an item of personal equipment of the user, which is totally reliable, fast, and effective, and fully protects the private life of the user.

PRESENTATION OF THE INVENTION

According to a first aspect, the invention relates to a method for processing biometric data performed by a proof entity and a verification entity connected together;

the proof entity having a biometric candidate datum, a biometric reference datum, a hash value of the biometric reference datum, a hash value of the biometric candidate datum; the verification entity having only the hash value of the biometric candidate datum;

the method comprising steps of:

(a) generation by a data-processing unit of the proof entity of a zero-knowledge proof of the assumption that the biometric candidate datum and the biometric reference datum coincide;

(b) transmission to the verification entity of said zero-knowledge proof, the hash value of the biometric candidate datum, and the hash value of the biometric reference datum;

(c) verification by a data-processing unit of the verification entity that the zero-knowledge proof is valid, and that the hash value received from the biometric candidate datum corresponds to the one the verification entity has.

By astutely using zero-knowledge proof, it is possible to export the essential details of the calculation to the personal terminal of users and give only one role of verifier to the items of equipment in charge of the control, a role which needs no knowledge of biometric data, but only of their hash values.

It is therefore no longer necessary to send biometric data in any form whatsoever and the private life of the user is therefore fully respected.

According to other advantageous and non-limiting characteristics:

the proof entity initially has only the biometric reference datum and the hash value of the biometric reference datum, the method comprising performing, by a data-processing unit of a trusted entity, of a prior step (a1) of:

generation of the biometric candidate datum from a biometric trait provided by a biometric acquisition unit of the trusted entity;

generation of the hash value of the biometric candidate datum obtained; and transmission to:

the proof entity of at least the biometric candidate datum obtained; and the verification entity of the hash value generated from the biometric candidate datum.

The method comprises a step (d) of opening a door arranged at one end of a corridor, the biometric acquisition unit of the trusted entity being arranged at the other end of the corridor, such that the steps (a) and (b) are conducted as a user of the proof entity travels along the corridor;

the proof entity also has an electronic signature of the biometric reference datum by an authority entity, the step (b) further comprising the transmission to the verification entity of the signature of the biometric reference datum, and the step (c) further comprising the verification that the signature of the biometric reference datum is valid;

the method comprises an even earlier step (a0) of:
generation by the data-processing unit of the proof entity of the biometric reference datum from a biometric reference trait associated with an official document, and of the hash value of the biometric reference datum;
obtaining the signature of the biometric reference datum.

obtaining the signature of the biometric reference datum at the step (a0) comprises the transmission to the authority entity of the official document, of the biometric reference datum, and of the hash value of the biometric reference datum, and the return receipt of the signature of the biometric reference datum generated by the authority entity from the hash value of the biometric reference datum, after verification;

the zero-knowledge proof is a cryptographic object of zkSNARK type;

the step (a) comprises prior verification that the biometric candidate datum and the biometric reference datum coincide;

the biometric candidate datum and the biometric reference datum coincide if their distance according to a given comparison function is under a predetermined threshold;

said zero-knowledge proof of the assumption that the biometric candidate datum and the biometric reference datum coincide is a zero-knowledge proof of the assumption that, given two hash values, there is a biometric candidate datum and a biometric reference datum having as respective hash values the given hash values, such that their distance is under the predetermined threshold according to the given comparison function;

the proof entity is a personal electronic device personal, of telephone, personal computer or digital tablet type.

According to a second aspect a system for processing biometric data comprising a proof entity and a verification entity connected together is proposed, characterized in that:
the proof entity comprises a data-processing unit configured to generate a zero-knowledge proof of the assumption that a biometric candidate datum and a biometric reference datum coincide, and to transmit to the verification entity said zero-knowledge proof, a hash value of the biometric candidate datum, and a hash value of the biometric reference datum;
the verification entity comprises a data-processing unit configured to verify that the zero-knowledge proof is valid, and that the hash value received from the biometric candidate datum corresponds to the one the verification entity has.

According to other advantageous and non-limiting characteristics:
the system further comprises a trusted entity comprising a biometric acquisition unit and a data-processing unit configured to:
generate the biometric candidate datum from a biometric trait provided by the biometric acquisition unit and the hash value of the biometric candidate datum obtained;
transmit to:
the proof entity, at least the biometric candidate datum obtained; and the verification entity, the hash value generated from the biometric candidate datum.

The system further comprises an authority entity comprising a data-processing unit configured to sign the hash value of the biometric reference datum on request of the proof entity.

According to a third and a fourth aspect, the invention proposes a computer program product comprising code instructions for execution of a method according to the first aspect for processing biometric data, and a storage medium readable by an item of computer equipment on which a computer program product comprises code instructions for execution of a method according to the first aspect for processing biometric data.

DESCRIPTION OF FIGURES

Other characteristics, aims and advantages of the present invention will emerge from the following detailed description with respect to the appended drawings given by way of non-limiting examples and in which.

DETAILED DESCRIPTION OF AT LEAST ONE EMBODIMENT OF THE INVENTION

Architecture

Figure 1:
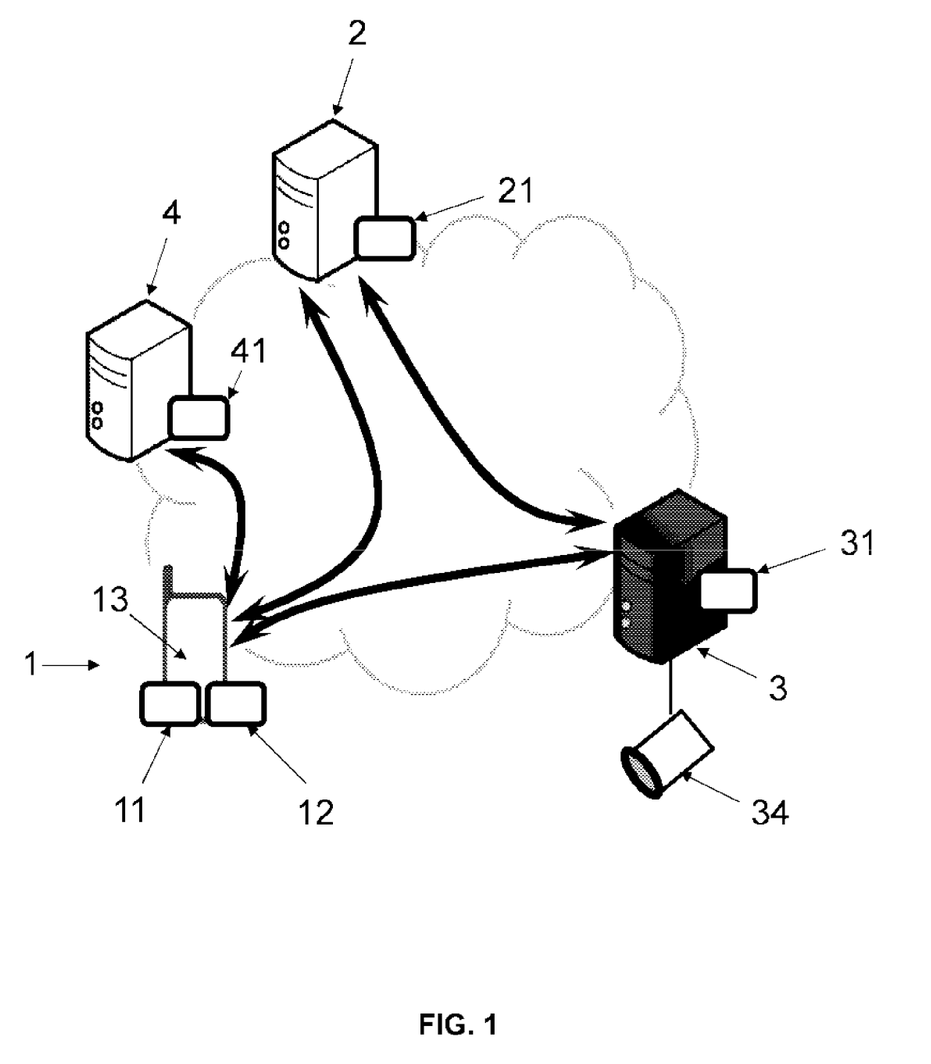
FIG. 1 schematically illustrates a system for executing the method according to the invention, FIG. 2 schematically illustrates a preferred embodiment of a system for executing the method according to the invention.

In reference to FIG. 1, this schematically illustrates a system for biometric authentication of individuals allowing verification of the result of the authentication.

This system comprises at least two items of equipment 1, 2. The first item of equipment 1 is an item of equipment personal to an individual, such as for example his mobile telephone, as explained hereinbelow. The second item of equipment 2 is held and controlled by an entity with which authentication must be performed, for example a governmental entity, customs, a company, etc. In the remainder of the present description the example of an airport will be taken.

One of the items of equipment performs identification on biometric data and then sends the result to the other which proceeds with verification of this result. In this way, according to a known system the first item of equipment 1 is an entity, called proof entity, which performs authentication and sends the result to the second item of equipment 2 which verifies this result, called verification entity.

The first item of equipment 1 comprises a data-processing unit 11, i.e. a computing unit such as for example a processor, a microprocessor, a controller, a microcontroller, a FPGA etc. This computing unit is adapted to execute code instructions for executing the method hereinbelow.

The first item of equipment 1 advantageously comprises a communications interface letting it dialog remotely with the second item of equipment 2 and other items of equipment such as a third item of equipment 3 which is an entity known as trustworthy (provided by a third party recognized by the entity with which authentication must be made, such as the airport, for example a security solution provider), and a fourth item of equipment 4 which is an entity known as authority (for example governmental). It should be noted that the verification entity 2 and the authority entity 4 can be merged.

The first item of equipment can also comprise a data storage unit 12 (a memory, for example flash) a user interface 13 (typically a touch screen), and optionally a biometric acquisition unit 14 (see below).

This communications interface is preferably the combination of a wireless communications interface, for example of Wifi or Bluetooth or mobile telephone network (GPRS, 3G, 4G or other) type and any other downstream communications network.

The second item of equipment 2 (and if needed the third and/or the fourth item of equipment 3, 4) also comprises as such a data-processing unit 21 (respectively 31, 41), i.e. a computing unit such as for example a processor, a microprocessor, a controller, a microcontroller, a FPGA etc. This computing unit is adapted to execute code instructions for executing the method hereinbelow.

These other items of equipment 2, 3, 4 advantageously also comprise communications interfaces letting them dialog with each other remotely and with the first item of equipment 1.

The second item of equipment 2 and the third item of equipment 3 are typically arranged near (for example both in the airport, and possible architectures will be shown later), and in this way can be wired together. The fourth item of equipment 4 is as such typically an item of remote equipment.

The first item of equipment 1 and the optional third item of equipment 3 are preferably capable of generating a biometric datum from a biometric trait of an individual. The biometric trait can for example be the form of the face, or one or more irises of the individual. Extraction of the biometric datum is carried out by processing of the image of the biometric trait which depends on the nature of the biometric trait. Processing varied images to extract biometric data is known to the skilled person. By way of non-limiting example, extraction of the biometric datum can comprise extraction of particular points or a form of the face in the case where the image is an image of the face of the individual.

In this way the third item of equipment 3 and optionally the first item of equipment 1 comprise a biometric acquisition unit 14, 34, typically an image sensor, for example digital photographic equipment or a digital camera, adapted to acquire at least one image of a biometric trait of an individual.

As will be evident, the fact that the trusted entity and the verification entity take the form of independent items of equipment 2, 3 ensures preventing the verification entity from having biometric data so as to guarantee the private life of users.

In an embodiment, the item of equipment 1 performs authentication of the individual, that is, compares a biometric datum called candidate, since it is recently acquired on the individual, to a single biometric called reference, supposed to come from the same individual, to verify that the individual from which the two data have been obtained is the same.

In this case the biometric reference datum used for authentication is advantageously a datum recorded in an identity document of the individual. For example, the biometric datum can be an image of the face featured on an identity document, or even an image of the face or of at least one iris of the individual recorded in a radiofrequency chip contained in the document.

Highly advantageously, the first item of equipment 1 described above is an electronic device personal to the individual, for example a telephone mobile or "smartphone", an electronic tablet or even a personal computer.

This lets an individual himself perform authentication prior to presenting the result to the second item of equipment 2. In this way the time-consuming authentication step comprising the acquisition of a fresh biometric datum on the individual and its comparison with one or more reference data is shifted upstream of a control by the second item of equipment 2.

A case in point is passing through customs by an individual typically when an aircraft lands. The latter can use his personal electronic device to perform biometric authentication against his passport prior to passing through customs. Then, when he does pass through customs, the individual sends the result to the second item of equipment 2 acting as verification entity (controlled for example by the airport) by means of his personal device 1. Only then does the verification entity proceed with verification. This reduces the time taken to pass through customs and therefore the wait queues which may result.

Figure 2:
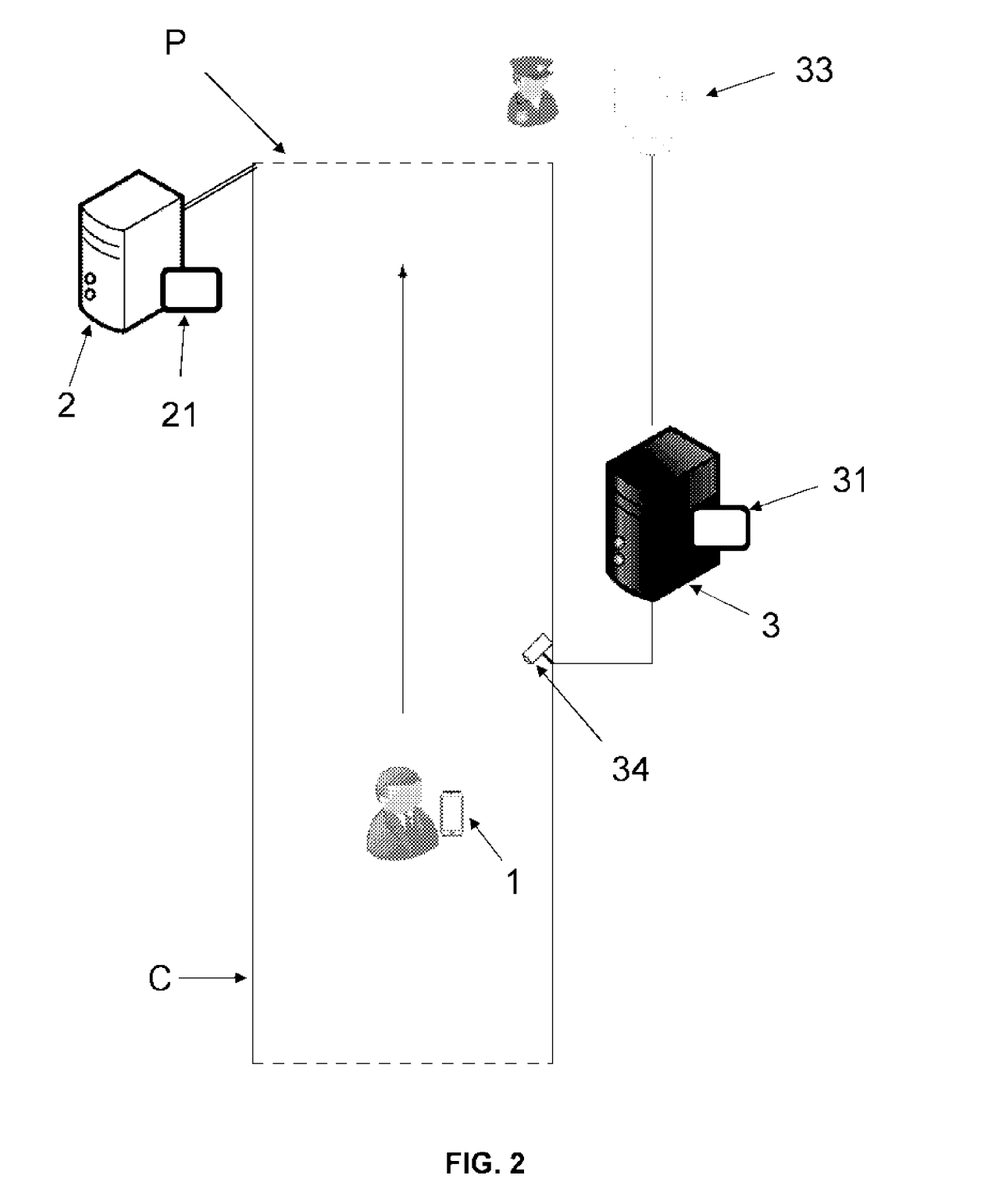

According to a particularly preferred embodiment illustrated by FIG. 2, the method aims for automatic opening of a door P at one end of a corridor C. The biometric acquisition unit 34 of the third item of equipment (the trusted entity) is arranged at the other end of the corridor C. At the first end of the corridor C (in the region of the door) is a man-machine interface 33 for operation by security personnel (overall responsible for passing through the door P).

As will be evident, this allows the processing of data (from a few seconds to several tens of seconds) to be carried out as the user moves down the corridor such that once he arrives at the door P this opens directly if authentication is conclusive, without the user having to wait. Such a corridor could be a few metres to several tens of metres (given 1 m/s as an order of magnitude of the average speed of an individual walking in the corridor). It should be noted that a travellator can be provided in the corridor C so as to precisely control the travel time.

Enrolment

As explained, the aim of the present method is for the second item of equipment 2 (the verification entity) to need to present proof of authentication of the individual only, but no biometric data.

In this way, the basic assumption is that when the method is initiated the proof entity (the first item of equipment 1) has a biometric candidate datum, a biometric reference datum, a hash value of the biometric reference datum, a hash value of the biometric candidate datum, and that the verification entity (the second item of equipment 2) has only the hash value of the biometric candidate datum.

By "hash value" of a biometric datum (also called "digest" of the datum), obtained by applying a cryptographic hashing function to the datum (typically families SHA-1 or SHA-2, in particular SHA-256). The hash value has a fixed size and reveals nothing on the datum it originates from: the biometric datum cannot be found from this hash value, in any case as long as the hashing function used is considered secure. But the hash value can be recalculated from the datum to verify that it is correct. The hash value of the biometric datum can be sent to any item of equipment without revealing information on the datum per se and therefore on the private life of the user.

In a preferred embodiment, the method comprises a prior step (a0) of "enrolment" for providing the reference datum on the first item of equipment 1. This step can be conducted long before the rest of the method and need not be repeated with each occurrence of the method (it can be conducted once a year, for example).

This step typically comprises:
- generation by the data-processing unit 11 of the proof entity 1 of the biometric reference datum from a biometric reference trait associated with an official document (in particular an identity document such as a passport or an identity card), and of the hash value of the biometric reference datum (always by application of a given hashing function); and
- obtaining the signature of the biometric reference datum.

The first part can be done in many ways. For example, on his terminal 1 the user can directly retrieve the biometric trait recorded in a radiofrequency chip contained in the document (if the item of equipment 1 has a radiofrequency reader of NFC type), take a photograph of this document with the unit 14, or even a photograph of himself, if needed in the presence of a representative of the authority (for example at a town hall office).

The second part, specifically obtaining the signature, advantageously needs having the biometric datum generated as reference datum validated by the control authority.

In this way, obtaining the signature of the biometric reference datum at step (a0) preferably comprises transmission to the authority entity (fourth item of equipment 4) of the official document (or at least of a photograph), of the biometric reference datum, and of the hash value of the biometric reference datum, and the return receipt of the signature of the biometric reference datum, after verification.

This verification can be done in many ways, and simply consists of verifying that the biometric reference datum submitted for verification is fully coherent with the official document, and that the hash value is that of the submitted datum.

The electronic signature of the datum guarantees his integrity and does this definitively (non-repudiation), by analogy with the handwritten signature of a paper document and is familiar to the skilled person. It is generated by the authority entity 4 from the hash value of the biometric reference datum and generally consists of a cipher of the hash value of the biometric reference datum. For this, the data-processing unit 41 of the authority entity 4 applies for example an asymmetrical encryption function to the hash value and sends it back now encrypted to the first item of equipment 1 as signature.

In general, it is clear that the step (a0) could be conducted irrespective of the way to securely provide the first item of equipment 1 with the biometric reference datum signed by an authority, governmental for example.

It should be noted that the step (a0) can also comprise providing the first item of equipment 10 with a cryptographic key of the authority entity 4. As will be clear below, this secret key will serve to initiate secure communications between the different items of equipment 1, 2, 3 during the authentication method.

Obtaining the Biometric Candidate Datum

An authentication method executed by the system 1 described above will now be described.

As explained it is assumed that the first item of equipment 1 has a biometric candidate datum, a biometric reference datum, a hash value of the biometric candidate datum, a hash value of the biometric reference datum, and optionally a signature of the biometric reference datum by a trustworthy authority. As explained, the latter can be obtained prior to an enrolment step (a0).

With respect to the biometric candidate datum, "fresh", this can be obtained during a previous step (a1). In other terms, the proof entity 1 can initially have (i.e. on completion of the step (a0)) only the biometric reference datum and the hash value of the biometric reference datum.

It is important to understand that if the enrolment step (a0) can be performed weeks prior to carrying out authentication, the step (a1) is at worst conducted a few minutes before the rest of the method, to ensure "freshness" of the biometric candidate datum.

The step (a1) is conducted by the data-processing unit 31 of the third item of equipment 3 (the trusted entity), and first of all comprises generation of the biometric candidate datum from a biometric trait provided by the biometric acquisition unit 34 of the trusted entity 3. In other terms, the user of the item of equipment 1 utilises an automatic device provided by the control authorities (in the airport) to extract the biometric candidate datum.

The hash value of the biometric candidate datum obtained is then generated; and finally the trusted entity transmits to:
- the proof entity 1, at least the biometric candidate datum obtained and optionally the hash value generated from the biometric candidate datum (in fact, the proof entity itself can generate it); and
- the verification entity 2, (only) the hash value generated from the biometric candidate datum, for the purpose of later verification.

It is clear that the step (a1) can alternatively be conducted by the proof entity 1, i.e. user an utilise a biometric trait provided by the biometric acquisition unit 14 of his own item of equipment 1, but using the trusted entity 3 is preferred so as to avoid the user "falsifying" the biometrics by placing a mask, for example. In this way, as is preferred the biometric acquisition unit 34 is capable of detecting the living to ensure that the biometric candidate datum has come from a "real" trait.

It should be noted that this step (a1) can comprise initiation of secure communication between the proof entity 1 and the trusted entity, in particular with any cryptographic key of the authority entity 4 obtained during the step (a0).

It is also preferably expected that the biometric candidate datum is erased from the trusted entity 3 once it is transmitted to the proof entity 1, for security.

Authentication Method

The present method is non-interactive, that is, it needs "sending" of information of the proof entity 1 to the verification entity 2 only once, and no "return". And above all, as explained, the verification entity will receive neither the biometric candidate datum nor the biometric candidate datum (nor any datum to be traced back to the latter), even though it is possible for the validation entity to know for sure whether the biometric candidate and reference data coincide.

For this, a cryptographic protocol is used generating "proof" that the biometric candidate datum and the biometric reference datum coincide, this proof revealing nothing other than the fact that these biometric data are correctly owned by the producer of the proof.

The protocol Pinocchio presented in the publication "Bryan Parno, Craig Gentry, Jon Howell, and Mariana Raykova, Pinocchio: Nearly Practical Verifiable Computation, in Proceedings of the IEEE Symposium on Security and Privacy, IEEE, 21 May 2013" was one of the first verifiable calculation protocols for the executor to verifiably calculate the application of any function and for the principal to verify the associated proof in a calculation time less than that necessary for performing the calculation itself.

In a first step (a), the data-processing unit 11 of the proof entity 1 generates for this a zero-knowledge proof of the assumption that the biometric candidate datum and the biometric reference datum coincide.

More precisely, said zero-knowledge proof guarantees the following affirmation: "given two hash values, there is a biometric candidate datum and a biometric reference datum having as respective hash values the given hash values, and coinciding".

In this way, the two hash values can be linked to the biometric candidate and reference data but information on the content of these biometric data cannot be obtained. The cryptographic protocol gives rapid proof to verify (less than a semi-second) and which cannot be falsified: it is almost impossible (probability of less than $\frac{1}{2}^{80}$, or even less than $\frac{1}{2}^{128}$ according to the parameters selected to carry out proof, the latter being slower to carry out) to have proof of the affirmation above accepted if the process has not proceeded as per specified.

In providing proof, the proof entity 1 uses the possibility of generating proofs with zero knowledge disclosure to hide the biometric data. In this way the proof gives no information on the biometric data themselves.

Naturally, the step (a) advantageously comprises prior verification that the biometric candidate datum and the biometric reference datum coincide (still on the proof entity 1, that is, the personal terminal of the user), by comparing the biometric candidate datum and the biometric reference datum.

In fact, as known, the biometric candidate datum and the biometric reference datum coincide if their distance according to a comparison function datum is under a predetermined threshold.

In this way, performing the comparison comprises calculating a distance between the data, whereof the definition varies as a function of the nature of the relevant biometric data. Calculation of the distance comprises calculating a polynom between the components of the biometric data, and advantageously calculation of a scalar product.

For example, in the case where the biometric data were obtained from iris images, a distance classically used for comparing two data is the Hamming distance. In the case where the biometric data were obtained from images of the face of an individual, it is common to utilize Euclidian distance.

This type of comparison is known to the skilled person and will not be described in more detail below.

The individual is authenticated if the comparison reveals a rate of similarity between the candidate datum and the reference datum exceeding a certain threshold, the definition of which depends on the distance calculated.

The proof is then more precisely a zero-knowledge proof of the assumption that since there are two hash values, there is a biometric candidate datum and a biometric reference datum having as respective hash values the given hash values, such that their distance according to the comparison function datum is under the predetermined threshold.

Generation of Proof

As is preferred, said zero-knowledge proof is a cryptographic object of zkSNARK type.

zkSNARK means "zero-knowledge Succinct Non Interactive ARgument of Knowledge". This concerns a cryptographic primitive built around the notion of proof. Researchers in theoretical computer science and cryptography have long had an interest in the notion of proof. Theoretical results exist for producing very brief and secure proof of an algorithm but the time for realizing this proof is out of scope and will stay that way despite the increase in calculating power of computers. One of the reasons is that the proof entity 1 (also called the prover) is given to the entity which performs proof. In the theoretical results of the proofs, the prover has infinite calculation power and proofs remain secure despite this.

The notion of proof was then relaxed, as the protocol is seeking protection from one prover only which would have substantial but limited calculating power. The result of the protocol is no longer proof but an argument. It is from this notion of argument that practical and verifiable calculation systems have been built. An additional requirement in a system producing an argument is that this argument is non-interactive: the verifier and the prover do not need to interact to produce the argument.

Embodiments of zkSNARKs have been presented since 2010: this is about arguments small in size (a few elements of an elliptical curve), which need no interactivity and which also prove performing zero-knowledge proof i.e. the proof contains no non-trivial information on the entries supplied by the prover.

There are several protocols which specifically produce zkSNARKs, and the skilled person could use them in various ways in the present method:

The Pinocchio protocol mentioned earlier;

The Gepetto protocol, presented in the publication "Craig Costello, Cedric Fournet, Jon Howell, Markulf Kohlweiss, Benjamin Kreuter, Michael Naehrig, Bryan Parno, and Samee Zahur, Geppetto: Versatile Verifiable Computation, in Proceedings of the IEEE Symposium on Security and Privacy, IEEE, 18 May 2015", which is an improvement on Pinocchio The protocol presented in this publication and the following "Eli Ben-Sasson, Alessandro Chiesa, Daniel Genkin, Eran Tromer, Madars Virza. SNARKs for C: Verifying Program Executions Succinctly and in Zero Knowledge. In Proceedings of the 33rd Annual International Cryptology Conference, CRYPTO '13, pages 90-108, 2013", implements open-source in the form of a library called libsnark, optimizing the protocol producing a zkSNARK in Pinocchio by improving the expressivity, that is, the type of programs or algorithm which it is possible to verify.

As an example of the Pinocchio protocol, this protocol comprises several parts:

1. A classic program is reflected in the form of an arithmetic circuit, that is, a set of relations between the inputs and the outputs of the program reflected only by means of additions and multiplications of elements of a finished body. It should be pointed out that all programs can in theory be reflected in this form but that some only of these programs admit effective translation in the form of a circuit.

2. The arithmetic circuit obtained is represented effectively by means of three families of polynoms to which a supplementary polynom is added, called target polynom. These families of polynoms form "Quadratic Arithmetic Programs" (QAPs). They encode the relations between the entries to and the exits from each multiplicative door of the circuit, the relations of the additive doors being integrated into the first following multiplicative door in the calculation.

These QAPs are linked to calculation verifiable by the following point: a calculation $y=C(x)$ is correct for an entry x if and only if all relations describing the corresponding arithmetic circuit are satisfied by fixing x as input value and y as output value.

To some extent, QAPs compress all the restrictions to verify in a single relation to be verified: a polynom constructed from the value x and the three families of the QAP must divide the target polynom.

3. A cryptographic protocol then inputs a QAP associated with a program, generates evaluation and verification keys which utilise elliptical curves to hide the polynomial relations. The polynom proving that the calculation has been made correctly is calculated directly by means of the relations hidden in the elliptical curve. The divisibility relation is reflected only by means of a constant number of elements of the elliptical curve, that is, the proof is of constant size. Verification of this proof is extremely fast.

The protocol also provides that entries of the calculation supplied by the prover are private: it hides the values of the prover in providing the proof by multiplying it by a multiple of the target polynom, which does not modify the fact that the "proof" polynom is divisible by the target polynom.

When hidden in an elliptical curve this "proof" polynom constitutes a zkSNARK.

The Pinocchio protocol lets the person providing the proof to hide some of the entries of the calculation of which he is providing proof. In the present case, the following calculation has to be made:

Entry: the hash values of the biometric candidate $h_{fresh}=H(t_{fresh})$ and reference $h_{ref}=H(t_{ref})$ datum, the result of comparison of the biometric candidate $t_{fresh}$ and reference $t_{ref}$ data (i.e. the Boolean according to whether they coincide or not), and an initialisation vector IV Private entry: the biometric candidate $t_{fresh}$ and reference $t_{ref}$ data.

Output: the proof $\pi$ that the prover knows biometric $t_{fresh}$ and $t_{ref}$ data which are hashed into $h_{fresh}$ and $h_{ref}$ and whereof the result of the comparison is as expected.

It should be noted that there are known protocols provided for generation of proof for smooth running of a hashing function which the skilled person could directly utilise even if they are not optimal. The difficulty is obtaining a reasonable calculation time for conducting proof and sizes of evaluation and verification keys which are not too substantial.

the Zerocash protocol (IEEE Security & Privacy 2014) by Ben-Sasson et al., proposes defining an arithmetic circuit to verify the compression function of SHA-256 which comprises around 30,000 multiplicative doors. This gives a time for completion of proof of around 5 seconds (per compression level, verifying the entire hashing function which comprises many iterations of the compression function will clearly be longer), which stays high and has room for improvement;

the ZKBoo protocol, presented in the publication "ZKBoo: faster zero-knowledge for Boolean circuits" by Giacomelli, Madsen and Orlandi (Usenix Security 2016)" enables better performance (proof in 50 ms, verification in 70 ms) by iteration of the compression function, but the size of the proof is substantial (800 Ko) especially since it seems to have been measured only on application of the compression function.

In the preferred embodiment of the "corridor" shown in FIG. 2, a minimal proof system is preferred but generation of which takes a few seconds, to the extent where this will be the motion time of the user, this wait therefore not being inconvenient and for him being a gauge of quality of the processing and security.

Sequence of the Method

In a step (b), the proof entity 1 sends the verification entity 2 said zero-knowledge proof, the hash value of the biometric candidate datum, and the hash value of the biometric reference datum. Optionally, the signature of the biometric reference datum is also sent if the proof entity 1 has it, but no other datum is sent (i.e. only the hash value of the biometric candidate datum, the hash value of the biometric reference datum, and the signature of the biometric reference datum are sent). To repeat, the biometric data as such are not sent.

As before, secure communication can be initiated between the two items of equipment by means of any key supplied during the step (a0).

In a step (c), the data-processing unit 21 of the verification entity 2 verifies that the zero-knowledge proof is valid and that the hash value received from the biometric candidate datum corresponds to the one the verification entity 2 has (in other terms the datum candidate used is definitely the fresh datum extracted just prior with the biometric acquisition unit 34).

If this is the case, the user is authenticated and other actions such as automatic opening of the door P can take place (see below).

If the reference datum is signed by the authority entity 4 (i.e. the proof entity 1 also has the electronic signature of the biometric reference datum, typically a cipher of his hash value), as explained, the step (b) can further comprise transmission to the verification entity 2 of the signature of the biometric reference datum, and the step (c) preferably comprises verification that the electronic signature of the biometric reference datum is valid, especially with a key of the authority supplied to the verification entity 2.

More precisely, the verification entity 2 will decipher the signature with this key and verify that the result is definitely the hash value which was transmitted.

Verification of proof at step (c) is not interactive (the verification entity 2 has no need to contact the prover, i.e. the proof entity 1) and is done simply in constant time by verifying that the proof is valid, which shows (at minimal probability) the verification entity 2 that the alleged property is true, i.e. the user has a biometric candidate datum and a biometric reference datum which coincide. This is entirely convincing that the identity of the user is confirmed (and that nobody has usurped an identity) despite the absence of biometric datum.

Based on proof, confidentiality can be total (since generation of proof needs no communication) without the verification entity 2 taking any risk since the proof guarantees that the proof entity has many biometric data.

The proof is brief (or even very brief—of the order of a few hundreds of octets) and sending it with the hash values of the document poses no bandwidth problem. Also, verification of this proof is fast (in constant time, a few tens of thousandths of seconds), which does not increase the calculation load at the data-processing unit 21 of the verification entity 2, which must manage hundreds of simultaneous authentications. The generation of the proof is as such heavier in terms of calculation time, but since the step (a) is conducted by the first item of equipment 1 which is personal (and involved only in authentication of its sole owner), this additional calculation time is not problematic, and even welcomed by users who have no problem in allocating a few tens of seconds of operating time of their personal terminal if this will avoid queuing up at ticket offices.

In this way the present method is optimal both for the user and for the provider (the airport, the customs, etc.).

Corridor

In the preferred embodiment of the corridor C, the user needs only to launch a dedicated application on his terminal 1 when entering the corridor C, all the rest being done automatically and transparently, which is highly agreeable to the user.

At launch, the secure connection with the trusted entity 3 is set up. From there, it can be expected that the biometric acquisition unit 34 is a set of cameras placed on the walls and observing all faces. Thus, just walking in the corridor the user is filmed, and the biometric candidate datum is generated by the trusted entity 3 and loaded onto his terminal 1, which then automatically makes the comparison and generates the proof as he keeps walking.

The secure connection with the verification entity 2 is then initiated and the proof and the two hash values are sent to it for verification. If this is conclusive, the door P opens.

It should be noted that a security agent can be placed in the region of the door to further verify the freshness of the biometric candidate data. For example, it can be provided that a man-machine interface 33 of the trusted entity 3 displays the biometric candidate data generated by the trusted entity 3, so that the security agent verifies that nobody is wearing a mask and can verify that people passing through the door are those who have been properly authenticated.

If the aim is to maximize security, it can be provided that individuals can pass through the door one by one only, the security agent observing their face alternately, but if the aim is to increase the rate it is quite simple to provide for the system to "lock" in case of an anomaly (for example invalid proof is received, or if hash values differ) until the security agent isolates and controls the responsible individual.

System

According to a second aspect, a system for processing biometric data for executing the method according to the first aspect is proposed.

The system is a set comprising a proof entity 1 (first item of equipment) a verification entity 2 (second item of equipment), and if needed, a trusted entity 3 (third item of equipment) and/or an authority entity 4 (fourth item of equipment).

The proof entity 1, which is typically a personal device of the user such as a smartphone, comprises a data-processing unit 11 configured to generate a zero-knowledge proof of the assumption that a biometric candidate datum and a biometric reference datum coincide, and transmit to the verification entity 2 said zero-knowledge proof, a hash value of the biometric candidate datum, and a hash value of the biometric reference datum (and optionally a signature of the biometric reference datum).

The data-processing unit 11 can further be configured to generate the biometric reference datum from a biometric reference trait associated with an official document, and the hash value of the biometric reference datum.

The verification entity 2 per se preferably never has biometric reference or candidate data, and only one hash value of the biometric candidate datum.

It comprises a data-processing unit 21 configured to verify that the received zero-knowledge proof is valid and that the hash value received from the biometric candidate datum corresponds to the one the verification entity 2 has. it can also be configured to verify that the electronic signature of the biometric reference datum is valid.

The trusted entity 3 comprises a biometric acquisition unit 34 and a data-processing unit 31.

The latter is configured to:
generate the biometric candidate datum from a biometric trait provided by the biometric acquisition unit 34 and the hash value of the biometric candidate datum obtained;
transmit to:
the proof entity 1, at least the biometric candidate datum obtained (and generally the hash value of the biographic candidate datum); and
the verification entity 2, (only) the hash value generated from the biometric candidate datum.

The authority entity 4 comprises a data-processing unit 41 configured to generate a signature of the biometric reference datum (i.e. a cipher of the hash value of the biometric reference datum) on request of the proof entity 1.

Computer Program Product

According to a third and a fourth aspects, the invention relates to a computer program product comprising code instructions for execution (in particular on the data-processing units 11, 21, 31, 41 of the entities 1, 2, 3, 4) of a method according to the first aspect of the invention for processing biometric data, as well as non-transitory computer readable support (a memory of entities 1, 2, 3, 4) containing this computer program product.

The invention claimed is:

1. A method for processing biometric data performed by a proof entity and a verification entity;
the proof entity having a biometric candidate datum, a biometric reference datum, a hash value of the biometric reference datum, a hash value of the biometric candidate datum; the verification entity having only the hash value of the biometric candidate datum;
the method comprising steps of:
(a) generation by a data-processing unit of the proof entity of a zero-knowledge proof of the assumption that the biometric candidate datum and the biometric reference datum coincide;
(b) transmission to the verification entity of said zero-knowledge proof, the hash value of the biometric candidate datum, and the hash value of the biometric reference datum;
(c) verification by a data-processing unit of the verification entity that the zero-knowledge proof is valid, and that the hash value received from the biometric candidate datum corresponds to the one the verification entity has.

2. The method according to claim 1, wherein the proof entity initially has only the biometric reference datum and the hash value of the biometric reference datum, the method comprising performing, by a data-processing unit of a trusted entity, a prior step (a1) of:
generation of the biometric candidate datum from a biometric trait provided by a biometric acquisition unit of the trusted entity;
generation of the hash value of the biometric candidate datum obtained; and
transmission to:
the proof entity of at least the biometric candidate datum obtained; and
the verification entity of the hash value generated from the biometric candidate datum.

3. The method according to claim 1, comprising a step (d) of opening a door arranged at one end of a corridor, the biometric acquisition unit of the trusted entity being arranged at the other end of the corridor, such that the steps (a) and (b) are conducted as a user of the proof entity travels along the corridor.

4. The method according to claim 1, wherein the proof entity also has an electronic signature of the biometric reference datum by an authority entity, the step (b) further comprising the transmission to the verification entity of the signature of the biometric reference datum, and the step (c) further comprising the verification that the signature of the biometric reference datum is valid.

5. The method according to claim 4, comprising an even earlier step (a0) of:
generation by the data-processing unit of the proof entity of the biometric reference datum from a biometric reference trait associated with an official document; and of the hash value of the biometric reference datum;
obtaining the signature of the biometric reference datum.

6. The method according to claim 5, wherein the obtaining the signature of the biometric reference datum at the step (a0) comprises transmission to the authority entity of the official document of the biometric reference datum and of the hash value of the biometric reference datum, and the return receipt of the signature of the biometric reference datum generated by the authority entity from the hash value of the biometric reference datum, after verification.

7. The method according to claim 1, wherein the zero-knowledge proof is a cryptographic object for zero-knowledge succinct non-interactive argument of knowledge (zkSNARK) type.

8. The method according to claim 1, wherein the step (a) comprises prior verification that the biometric candidate datum and the biometric reference datum coincide.

9. The method according to claim 8, wherein the biometric candidate datum and the biometric reference datum coincide if their distance according to a given comparison function is under a predetermined threshold.

10. The method according to claim 9, wherein said zero-knowledge proof of the assumption that the biometric candidate datum and the biometric reference datum coincide is a zero-knowledge proof of the assumption that, given two hash values, there is a biometric candidate datum and a biometric reference datum having as respective hash values the given hash values, such that their distance is under the predetermined threshold according to the given comparison function.

11. The method according to claim 1, wherein the proof entity (1) is a personal electronic device of telephone, personal computer or digital tablet type.

12. A system for processing biometric data comprising a proof entity and a verification entity, characterized in that:
the proof entity comprises a data-processing unit configured to generate a zero-knowledge proof of the assumption that a biometric candidate datum and a biometric reference datum coincide, and to transmit to the verification entity said zero-knowledge proof, a hash value of the biometric candidate datum, and a hash value of the biometric reference datum;
the verification entity comprises a data-processing unit configured to verify that the zero-knowledge proof is valid and that the hash value received from the biometric candidate datum corresponds to the one the verification entity has.

13. The system according to claim 12, further comprising a trusted entity comprising a biometric acquisition unit and a data-processing unit configured to:
generate the biometric candidate datum from a biometric trait provided by the biometric acquisition unit and the hash value of the biometric candidate datum obtained;
transmit to:
the proof entity, at least the biometric candidate datum obtained; and
the verification entity, the hash value generated from the biometric candidate datum.

14. The system according to claim 13, further comprising an authority entity comprising a data-processing unit configured to sign the hash value of the biometric reference datum on request of the proof entity.

15. Non-transitory computer readable support with a memory storing code instructions for the implementation of, a method for processing biometric data performed by a proof entity and a verification entity;
the proof entity having a biometric candidate datum, a biometric reference datum, a hash value of the biometric reference datum, a hash value of the biometric candidate datum; the verification entity having only the hash value of the biometric candidate datum;
the method comprising steps of:
a) generation by a data-processing unit of the proof entity of a zero-knowledge proof of the assumption that the biometric candidate datum and the biometric reference datum coincide;
b) transmission to the verification entity of said zero-knowledge proof, the hash value of the biometric candidate datum, and the hash value of the biometric reference datum;
c) verification by a data-processing unit of the verification entity that the zero-knowledge proof is valid, and that the hash value received from the biometric candidate datum corresponds to the one the verification entity has when said instructions are executed by a computer reading said non-transitory computer readable support.

* * * * *